United States Patent Office 3,259,590
Patented July 5, 1966

3,259,590
POLYMERS OF OXACYCLOALKANES PREPARED WITH ORGANIC ALUMINUM CO-CATALYST
Klaus Weissermel, Edgar Fischer, and Klaus Küllmar, all of Frankfurt am Main, and Manfred Reiher, Hofheim, Taunus, Germany, assignors to Farbwerke Hoechst Aktiengesellschaft vormals Meister Lucius & Brüning, Frankfurt am Main, Germany, a corporation of Germany
No Drawing. Filed May 25, 1960, Ser. No. 31,532
Claims priority, application Germany, May 29, 1959, F 28,549; June 6, 1959, F 28,628
10 Claims. (Cl. 260—2)

The present invention relates to homopolymers and copolymers of oxacycloalkanes and a process for preparing same. The invention relates more particularly to a process for homopolymerizing and copolymerizing oxacyclobutanes and oxacyclopentane in the presence of novel, very active organo-metal catalyst systems.

It is known to polymerize oxacyclobutanes in the presence of Friedel-Crafts catalysts, for example, borotrifluoride, tin tetrachloride or aluminum chloride and their complex compounds, or in the presence of trialkyloxonium-fluoroborates at low temperatures, preferably at temperatures of about —50° C., to yield polyethers of high molecular weight (cf. British Patents 723,777; 758,450 and 769,116).

It is also known to polymerize 3,3-bis-(chloromethyl)-oxacyclobutane in the presence of triethyl aluminum (cf. M. Hatano and S. Kambara, J. Polym. Sci., vol. 35, pages 275–277 (1959)). According to M. Hatano and S. Kambara the aforesaid process has, however, the disadvantage that, in spite of the consumption of a large portion of catalyst (5 mol percent, the polymerization proceeds very slowly and useful yields are obtained only at temperatures above 90° C. The authors of the aforesaid article point out that after a reaction time of more than 34 hours at room temperature the yield of polymer amounts to no more than 0.2% and that the polymers thus obtained as well as the polymers prepared at very high temperatures are of low molecular weight and consequently not very interesting for further treatment.

With regard to the polymerization of oxacyclopentane it is known that oxacyclopentane undergoes polymerization in the presence of metal or non metal halides, the etherates of which are capable of forming tertiary oxonium salts, the said polymerization resulting, according to the reaction conditions, in the formation of oils, waxes or solid products. According to a modification of that process (cf. German Patents 766,208 and 914,435) oxacyclopentane is polymerized in the presence of metal or non metal halides such as $BF_3$, $AlCl_3$, $FeCl_3$, $SnCl_4$ and $SbCl_5$ which in combination with acyl halides, anhydrides, alpha-halo-ethers, inorganic or organic acids form complexes with difficulty polarizable anions, for example, $BF_4^-$, $AlCl_4^-$, $FeCl_4^-$ or $SbCl_6^-$.

It is also known (cf. German Patent 914,436) that the abovementioned catalysts, that is to say the complex compounds of metal or non metal halides which are of the nature of salts, not only initiate the polymerization of oxacyclopentane, but are also effective as depolymerization catalysts, so that these catalysts do in general not enable a preparation of polymers which are principally of high molecular weight and have pronouncedly thermoplastic properties.

It is also known from the articles of S. Kambara and M. Hatano (J. Polym. Sci., vol. 27, page 586 (1958)) that oxacyclopentane does not undergo polymerization in the presence of aluminum triethyl.

It has now been found that organic metal compounds, preferably organic metal compounds of elements of main group III and sub-group II of the Periodic Table of Mendeléeff, in combination with organic halogen compounds, preferably in combination with halo-ethers, are most suitable for homopolymerizing and copolymerizing oxacyclobutanes and oxacyclopentane to yield polymers of high molecular weight.

As organic metal compounds that are suitable for use in carrying out the process of the invention there may be mentioned by way of example organo-aluminum compounds of the general formula

in which R represents a monovalent alkyl radical containing 1 to 6 carbon atoms, a monovalent oxalkyl radical containing 1 to 6 carbon atoms, a hydrogen atom or a halogen atom, preferably chlorine, $R_1$ represents a hydrogen atom, halogen, preferably chlorine, or a monovalent alkyl radical containing 1 to 6 carbon atoms and $R_2$ represents a monovalent alkyl radical containing 1 to 6 carbon atoms.

As organo-aluminum compounds there may be used, for example,

Trimethyl aluminum,
Triethyl aluminum,
Tri-isobutyl aluminum,
Trioctyl aluminum,
Di-isobutyl aluminum hydride,
Diethyl ethoxy aluminum,
Diethyl aluminum chloride,
Aluminum sesquichloride,
Methyl aluminum dichloride,
Ethyl aluminum dichloride.

Other suitable organic metal compounds which may be used in the process of the invention are organo-zinc compounds, preferably zinc-dialkyl compounds, the alkyl radical of which contains 1 to 6 carbon atoms, in particular zinc diethyl, and the combination of the following organic metal compounds:

$Al(R)_3 + Zn(R)_2$ in which R stands for $C_2H_5$ or $CH_3$;
$Al(R)_3 + B(R)_3$ in which R stands for $C_2H_5$, $C_4H_9$ or $CH_3$;
$Al(R)_3 + Ti(OR)_4$ in which R stands for isopropyl, $CH_3$ or $C_2H_5$.

It is in general of advantage that the proportion of the organo-aluminum compounds contained in the aforesaid combinations of organic metal compounds amounts to at least 50 mol percent. If the above-mentioned organic metal compounds whose elements belong to main group III and sub-group II of the Periodic Table are used alone they are, under the reaction conditions chosen, only in part capable of initiating the polymerization of oxacyclobutanes at room temperature or lower temperatures. They obtain their high activity only after the addition of halogen-containing organic compounds. Besides they are not capable of initiating the polymerization of oxacyclopentane.

The above-mentioned organic metal compounds are of rather different activity. Trialkyl aluminum compounds in combination with organic halogen compounds are in general more effective than dialkyl aluminum compounds. The catalytic efficiency of the organo-aluminum compounds decreases as their molecular weight increases.

Suitable halogen-containing compounds which in combination with the above-mentioned organic metal compounds yield a very active catalyst for the polymerization of oxacyclopentanes, are organic halogen compounds in which the mobility of the halogen is smaller than that of ethyl-alpha-chlorisopropyl ether. By mobility of the halogen there is here understood the speed of solvolysis in an organic solvent, for example ethanol.[1] Examples of such compounds are

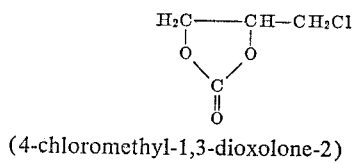

(4-chloromethyl-1,3-dioxolone-2)

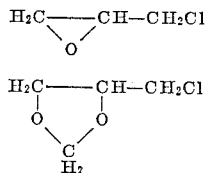

(4-chloromethyl-1,3-dioxolane)

$CH_3OCH_2CH_2Cl$,
$ClCH_2CH_2OCH_2CH_2Cl$,
$HOCH_2C(CH_2OCF_2—CFClH)_3$,
$C_2H_5OCF_2CFHCF_3$ (ethylpentafluoropropyl ether).

All of the above-mentioned compounds are characterized by the fact that they contain at least one halogen atom, preferably fluorine and/or chlorine, in the molecule. In combination with the organic metal compound or compounds they yield the effective catalyst. The use of several halogen-containing organic compounds in combination with organic metal compounds is also possible. The amount of organic metal compounds required for the homopolymerization or copolymerization of oxacyclobutanes or oxacyclopentane depends principally on the following factors:

(1) Type and quantity of the halogen-containing components,
(2) Type and quantity of the solvent,
(3) Reactivity of the monomer,
(4) Reactivity of the organic metal compound and
(5) Reaction temperature.

The quantity of the organic metal compound or compounds may vary within wide limits according to the reaction conditions chosen. Often, traces of organo-metal, preferably organo-aluminum, compounds suffice for initiating the polymerization according to the invention. In general the concentration of the organic metal compound or compounds is within the range of 0.005 to 10% by weight, preferably 0.05 to 4% by weight, the percentages being calculated on the monomer used.

The ratio of the organic metal compound or compounds and the halogen-containing compound or compounds contained in the catalyst system to be used in the process of the invention may vary within wide limits. In general there will, however, be chosen at least an equimolar proportion. In many cases it is suitable to use an excess, for example, 5 to 8 times the molar quantity, of one or more halogen-containing compounds since the catalytic efficiency is thereby increased and the halogen-containing compounds which are cheap as compared to the organic metal compounds can more easily be removed from the polymer.

In the presence of the highly active catalyst systems to be used in the process of the invention oxacyclobutanes can be converted very rapidly even at room temperature into homopolymers or copolymers of high molecular weight. It is also possible to copolymerize oxacyclobutanes with other cyclic ethers, for example, oxacyclopropanes and oxacyclopentanes, or with other cyclic systems which contain at least one ether grouping, for example diethylene glycol formal.

[1] Concerning the determination of the speed of solvolysis of, for example, chlorine ethers, cf. inter alia "Journal of the Chemical Society," London, 1955, pages 3641 to 3647.

As oxacyclobutanes that may be polymerized by the process of the invention there may be mentioned compounds of the general formulae

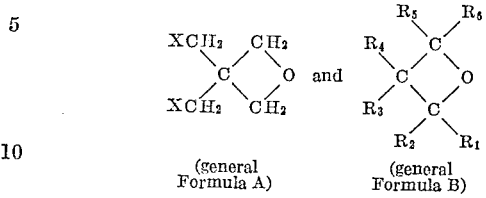

In general Formula A, X represents a halogen atom (F, Cl, Br, I) and/or H, an alkyl radical ($CH_3$, $C_2H_5$, $C_3H_7$, $C_4H_9$ and the like) or an alkoxy radical (O—$CH_3$, $OC_2H_5$, $OC_4H_9$ and the like).

As examples of compounds of general Formula A there may be mentioned:

3,3-bis-(halomethyl)-oxacyclobutane,
3-halomethyl-3-alkyl-oxacyclobutane,
3-halomethyl-3-alkoxymethyl-oxacyclobutane,
3,3-bis-alkoxymethyl-oxacyclobutane,
3,3-dialkyl-oxacyclobutane.

In general Formula B, $R_1$ to $R_6$ represent hydrogen atoms, part of which may be replaced by alkyl radicals.

As particular compounds of general Formula B there may be mentioned by way of example oxacyclobutane (trimethylene oxide), oxacyclobutanes which are mono- or dialkylated in position 2, 3 or 4, for example, 2-methyl-oxacyclobutane, 2,3-dimethyl-oxacyclobutane, 4-ethyl-oxacyclobutane or 4,4-diethyl-oxacyclobutane.

Oxacyclobutanes that are industrially important are in the first place those based on pentaerythritol, which can now easily be prepared by known methods. Oxacyclobutanes of this kind are essentially halomethyl oxacyclobutanes disubstituted in position 3, in particular 3,3-bis-(chloromethyl)-oxacyclobutane. The polymers which can be prepared from the last-mentioned monomer by the process of the invention at room temperature are products having a high molecular weight or more than 20,000 and a softening point of more than 160° C. They can be worked up into foils, plates and numerous shaped structures by methods which are known for working up artificial thermoplastic materials. The polymers have a large field of application.

According to the process of the invention the polymerization of oxacyclopentane preferably leads to the formation of tough, rubbery-elastic products of high molecular weight and a pronouncedly thermoplastic character. Since the polymerization according to the invention is carried out in the absence of strong Lewis acids, a careful removal of the remaining portions of the catalyst from the polymer can in most cases be dispensed with.

The combination of organic metal compounds, preferably organo-aluminum compounds, with halogen-containing organic compounds, preferably beta-halo ethers, according to the invention thus constitutes a novel, effective catalyst system for the polymerization of cyclic ethers, especially for the polymerization of higher cyclic ethers.

The homopolymerization and copolymerization of oxacyclobutanes, preferably of oxacyclobutanes disubstituted in position 3, and oxacyclopentane can be carried out in the presence or absence of an inert organic solvent. All inert solvents used are advantageously free from such impurities as can enter into reaction with the catalyst system. Water, alcohol and acids are in particular to be excluded from use as solvents in the present process.

Suitable solvents are hydrocarbons, for example, butane, pentane, hexane, cyclohexane, hydrogenated diesel oils having a boiling range of 180° to 250° C., benzene, toluene and halogenated hydrocarbons, for example, methyl chloride, methylene chloride, chloroform, carbon tetrachloride, fluorodichloromethane or ortho-dichlorobenzene. These solvents may be used alone or in combination. The proportion of monomer to organic solvent may vary within wide limits, for example, within the range of 12:1 to 1:6, preferably within the range of 6:1 to 1:3.

The polymerization of oxacycloalkanes according to the invention is in general carried out at temperatures within the range of −80° C. to +150° C. In special cases the polymerization may be carried out at temperatures below −80° or above 150° C. The polymerization temperature depends on the type and the quantity of the catalyst system that is chosen, on the reactivity of the monomer or the mixture of monomers and on the type and the quantity of the solvent used. If products of high molecular weight are to be obtained the temperature should not exceed 75° C. The speed of polymerization is within the range of a few minutes to several hours and depends to a large extent on the reaction conditions.

Depending on the choice of the monomer or the mixture of monomers and the reaction medium, the polymer is obtained in the form of a loose, granular powder or in the form of a tough, solid mass.

Since the polymerization of oxacycloalkanes according to the invention is carried out in the absence of metal halide or non metal halide catalysts which, as is known, act not only as polymerization catalysts but also as depolymerization catalysts for ethers of high molecular weight, a careful removal of the catalyst components used can often be dispensed with. During the hydrolysis of the organic metal compounds metal hydroxides or metal oxides, that is to say compounds which are anyhow recommended as fillers for many polymers and which do not have depolymerizing properties form in addition to readily volatile hydrocarbons.

The polymerization can be carried out continuously as well as discontinuously. Oxygen and moisture have to be excluded to a large extent during the polymerization since they would influence the efficiency of the catalyst and make its control impossible.

As has already been mentioned above, oxacycloalkanes cannot only be homopolymerized but also be copolymerized by means of the catalyst system according to the invention. The oxacyclobutanes can be copolymerized with one another, for example, 3,3-bis-(chloromethyl)-oxacyclobutane can be copolymerized with 3,3-bis-(iodomethyl) oxacyclobutane, or they can be copolymerized with other cyclic ethers, for example, oxacyclopropanes such as propylene oxide, oxacyclopentanes such as tetrahydro-furane, or higher ring systems which contain at least one ether grouping in the molecule, for example, diethylene-glycol formal (1,3,6-trioxacyclooctane).

The polyethers of high molecular weight which can be prepared from oxacycloalkanes by the process of the invention can be worked up thermoplastically into various shaped structures. It is possible to add to these polymers certain substances which influence the properties of the final products, which have the effect of a stabilizer and/or a plasticizer or serve for the introduction of special terminal groups into the polymer. The oils or waxes of low molecular weight which can also be prepared can be used as organic intermediate products, plasticizers, textile auxiliaries, lubricants and the like.

The following examples serve to illustrate the invention but they are not intended to limit it thereto, the parts being by weight.

EXAMPLE 1

39 parts of 3,3-bis-(chloromethyl)-oxacyclobutane were dissolved in 50 parts of anhydrous hydrogenated diesel oils having a boiling range of 180 to 250° C. and combined with 2 parts of epichlorhydrine. 0.4 part of aluminum triethyl was added dropwise while stirring under nitrogen. After a short time polymerization set in, which was preceptible by the separation of the polymer at about 5° C. After 8 hours 10 parts of methanol were added to the polymerization batch, the polymer that had formed was filtered off and after disintegration it was boiled with methanol under reflux and dried for 24 hours at 80° C. The yield amounted to 31 parts of a white polymer having a crystallite melting point of 173 to 177° C., a density of 1.417 and a content of chlorine of 44.6% by weight.

For the purpose of further characterizing the polymer a foil 1 mm. thick was prepared from the product in the following way: The polymer was preheated for 1 minute at 180° C., pressed for 2 minutes under a pressure of 200 kg./cm.$^2$ and cooled for 2 minutes while the pressure of 200 kg./cm.$^2$ was maintained.

The following values were measured with the foil thus obtained:

Ultimate tensile strength: 405 kg./cm.$^2$,
Tensile-E-modulus (modulus of elasticity in tension): 10,453 kg./cm.$^2$ (average value of three measurements),
Elongation at break: 12%.

EXAMPLE 2

39 parts of 3,3 - bis - (chloromethyl) - oxacyclobutane were dissolved in 30 parts of absolute pentane and combined with 2 parts of methyl-beta-chloroethyl ether. 0.5 part of aluminum triethyl was added dropwise at 25° C. while stirring. In the course of the polymerization the polymer was obtained as a solid mass. After 6 hours 10 parts of methanol were added, the solvent was separated, the polymer was disintegrated, boiled with methanol and dried for 24 hours at 80° C.

Yield: 32 parts,
Crystallite melting point: 165 to 169° C.,
Density: 1.408,
Tensile-E-modulus (modulus of elasticity in tension)[1]: 7,123 (average value of 3 measurements),
Ultimate tensile strength [1]: 369 kg./cm.$^2$.

EXAMPLE 3

65 parts of 3,3-bis-(chloromethyl)-oxacyclobutane were dissolved in 30 parts of pentane and 20 parts of methylene chloride and combined with 5 parts of epichlorohydrine. 0.8 part of aluminum triethyl was added dropwise while stirring at −10° C. Polymerization set in very rapidly after 10 minutes. The temperature of polymerization was maintained within the range of −8° C. to −11° C. After 8 hours the batch was worked up in the manner described in Example 1 and the polymer was dried for 12 hours at 45° C. in a vacuum drier. Yield: 60 parts.

Crystallite melting point: 159 to 163° C.,
Density: 1.406.

A foil 1 mm. thick prepared under the conditions described in Example 1 had the following values:

Tensile-E-modulus (modulus of elasticity in tension): 5,350 kg./cm.$^2$ (average value of three measurements),
Tensile strength: 281 kg./cm.$^2$,
Elongation at maximum strength: 16%,
Ball pressure hardness (10 seconds): 770,
Ball pressure hardness (60 seconds): 687,
Shore hardness D: 77.

EXAMPLE 4

26 parts of 3,3-bis-(chloromethyl)-oxacyclobutane were dissolved at 0° C. in 20 parts of pentane and 5 parts of methylene chloride and combined with 2 parts of epichlorhydrine. 0.2 part of aluminum triethyl was added and the reaction mixture was stirred for 8 hours at 0° C.

The working up was carried out under the conditions described in Example 1. Yield: 16 parts of polymer.

---

[1] Determined with a foil 1 mm. thick which had been prepared under the conditions mentioned in Example 1.

Crystallite melting point: 165 to 169° C.,
Density: 1.411,
Tensile strength: 321 kg./cm.² (foil 1 mm. thick),
Elongation at maximum strength: 16% (foil 1 mm. thick).

separated out but that a liquid phase is still externally perceptible, and the term "largely polymerized" means that the whole of the polymerization batch is converted into a compact block and a liquid phase can no more be perceived externally.

Table

| Example No. | Organic metal compound in parts | Halogen compound in parts | Result after 6 hours at 20° C. | Yield of polymer in parts |
|---|---|---|---|---|
| 6 | 0.03 of (C₄H₉)₃—Al | 0.2 of epichlorhydrine | Slightly polymerized | (Not worked up.) |
| 7 | 0.03 of (C₄H₉)₃—Al | do | Largely polymerized | Do. |
| 8 | 0.03 of (C₂H₅)₂AlCl | do | Partially polymerized | 1.3. |
| 9 | 0.03 of (C₄H₉)₂AlH | do | Largely polymerized | (Not worked up.) |
| 10 | 0.02 of (C₂H₅)₃Al plus 0.01 of (C₄H₉)₃B. | do | do | Do. |
| 11 | 0.03 of (C₂H₅)₂Zn | do | Partially polymerized | 2.4 after 24 hours. |
| 12 | 0.02 of (C₂H₅)₃Al plus 0.01 of Ti(isopropylate)₄. | do | do | (Not worked up.) |
| 13 | 0.02 of (C₂H₅)₃Al | do | Largely polymerized | Do. |
| 14 | 0.03 of (C₂H₅)₃Al | 0.2 of CH₃OCH₂CH₂Cl | do | 2.3. |
| 15 | 0.03 of (C₂H₅)₃Al | 0.2 of CH₂—CH—CH₂Cl (with O—CH₂—O bridge, cyclic carbonate) | Partially polymerized | 1.7. |
| 16 | 0.03 of (C₂H₅)₃Al | 0.2 of CH₂—CH—CH₂Cl (with O—C(=O)—O bridge) | do | (Not worked up.) |
| 17 | 0.03 of (C₂H₅)₃Al | 0.2 of HOCH₂—C—(CH₂OCF₂OFClH)₃ | Largely polymerized | 2.5. |
| 18 | 0.03 of (C₂H₅)₃Al | 0.2 of cyclohexyl-O—C(CH₃)(H)—Cl | do | (Not worked up.) |
| 19 | 0.03 of (C₂H₅)₃Al | | Slightly polymerized | Do. |
| 20 | 0.03 of (C₂H₅)₃Al | 0.2 of phenyl-O—C(CH₃)(H)—Cl | Largely polymerized | 1.7. |
| 21 | 0.03 of (C₂H₅)₃Al | 0.2 of HC(CH₃)₂—OCH₂Cl | do | (Not worked up.) |
| 22 | 0.03 of (C₂H₅)₃Al | 0.2 of C₄H₉OCH₂Cl | Partially polymerized | Do. |
| 23 | 0.03 of (C₂H₅)₃Al | 0.2 of CH₃—C(CH₃)₂—O—CF₂—CFCl₂ | Largely polymerized | Do. |
| 24 | 0.03 of (C₂H₅)₃Al | 0.2 of HOCH₂—C—(CH₂OCF₂CFClH)₃ | do | 1.9. |

EXAMPLE 5

26 parts of 3,3-bis-(chloromethyl)-oxacyclobutane were dissolved in 15 parts of pentane and combined with 0.3 part of epichlorhydrine. 0.32 part of aluminum triethyl was added at 10° C.

After 10 hours the polymerization batch was worked up in the usual manner.

Yield: 17 part of polymer.

EXAMPLES 6 TO 24

These experiments, in each of which 2.5 parts of 3,3-bis-(chloromethyl)-oxacyclobutane (Examples 6 to 18) or of 3,3-bis-(iodomethyl)-oxycyclobutane (Examples 19 to 24) dissolved in 1.5 parts of pentane and 0.2 part of methylene chloride were polymerized with one of the catalyst systems indicated in the table given below, show that the course of the reaction can be regulated to a large extent by the choice of an appropriate catalyst system.

In column 4 of the table the term "slightly polymerized" conveys the meaning that the batch is still in a predominantly liquid phase and that only a small quantity of polymer has separated out; the term "partially polymerized" means that considerable quantities of polymer have

EXAMPLE 25

10 parts of 3,3-bis-(iodomethyl)-oxacyclobutane were dissolved in 10 parts of absolute pentane and 2.5 parts of absolute methylene chloride and combined with 0.9 part of epichlorhydrine under nitrogen. About 0.1 part of (C₂H₅)₃Al was added dropwise at a temperature within the range of 5 to 10° C. After a short time, polymerization set in at 5 to 8° C. After 8 hours the polymerization batch was solidified and formed a solid block. In order to work up the polymer the latter was boiled several times with methanol and dried in vacuo for 24 hours at 50° C.

Yield: 7.9 parts.

Melting point: 280 to 290° C. (with decomposition).

EXAMPLE 26

26 parts of 3,3-bis-(chloromethyl)-oxacyclobutane were combined with 5 parts of diethylene glycol formal and 17 parts of pentane. 2 parts of epichlorhydrine and 0.5 parts of 4-chloromethyl-1,3-dioxolone-2 were added at 5 to 10° C. Then 0.3 part of triethyl aluminum were added dropwise under nitrogen while stirring and the reaction mixture was stirred for 24 hours at a temperature within the range of 5 to 10° C. Subsequently 20 parts of methanol were added, the polymer was filtered off, worked up in the usual manner and dried in vacuo for 24 hours at 40° C.

Yield: 18 parts.

*Analysis.*—Found: C, 40.3%, 40.1%; H, 5.9%, 5.9%; Cl, 36.5%, 36.6%. Crystallite melting point: 153 to 157° C.

EXAMPLE 27

26 parts of 3,3-bis-(chloromethyl)-oxacyclobutane were combined with 3.5 parts of absolute oxacyclopentane and 15 parts of pentane whereupon 0.3 part of epichlorhydrine was added to the solution. Then 0.4 part of triethyl aluminum was added dropwise at 5° C. under nitrogen while stirring and the batch was stirred for 24 hours at a temperature within the range of 5 to 25° C. The polymer was obtained in the form of a rubber-elastic tough mass, it was disintegrated before being worked up, boiled several times with methanol and dried in vacuo at 40° C. Yield: 28 parts.

*Analysis.*—Found: C, 41.6%, 41.7%; H, 5.7%, 5.7%; Cl, 39.3%, 39.4%. Crystallite melting point: 135 to 139° C.

For the purpose of a further examination of the polymer a foil 1 mm. thick was prepared from the polymer under the following conditions:

3 minutes of preheating at 160° C.,
2 minutes of pressing under a pressure of 100 kg./cm.$^2$.

The following values were measured on the foil thus obtained:

Tensile strength: 73 kg./cm.$^2$,
Elongation at maximum strength: 20%,
Ultimate tensile strength: 158 kg./cm.$^2$ (average value of 5 measurements),
Elongation at break: 621.

EXAMPLE 28

26 parts of 3,3-bis-(chloromethyl)-oxacyclobutane and 3.5 parts of propylene oxide were combined with 2 parts of epichlorhydrine and 0.22 parts of triethyl aluminum was carefully added at 0° C. Polymerization set in immediately with the formation of heat. The batch became very quickly highly viscous and finally solidified, forming a rubber-elastic, tough, milky mass. After 24 hours the polymer was dissolved in hot chlorobenzene, precipitated with petroleum ether and washed with methanol. After a drying in vacuo at 50° C. the yield of polymer amounted to 26.8 parts.

*Analysis.*—Found: C, 39.8%, 40.1%; H, 5.5%, 5.8%; Cl, 40.7%, 40.8%. Crystallite melting point: 148 to 152° C.; Density: 1.36.

For the purpose of a further examination of the polymer a foil 1 mm. thick was prepared from it under the following conditions:

3 minutes of preheating at 160° C,
2 minutes of pressing under a pressure of 100 kg./cm.$^2$.

Since the foil that had thus been prepared contained some bubbles the following values which had been measured on it are only of an orienting nature:

Tensile strength: 109 kg./cm.$^2$,
Elongation at maximum strength: 16%,
Ultimate tensile strength: 212 kg./cm.$^2$,
Elongation at break: 741%.

EXAMPLE 29

2 parts of 3,3-bis-(chloromethyl)-oxacyclobutane and 2 parts of 3,3-bis-(iodomethyl)-oxacyclobutane were dissolved in 5 parts of absolute pentane and 3 parts of absolute methylene chloride and combined with 0.4 parts of epichlorhydrine. About 0.04 part of $(C_2H_5)_3Al$ was then added dropwise with the exclusion of air and the polymerization batch was allowed to stand for 10 hours at +5° C. After a working up in the usual manner 3.2 parts of polymer having a melting point within the range of 197° C. to 207° C. were obtained.

EXAMPLE 30

88 parts of absolute oxacyclopentane that was free from peroxide were carefully combined at 0° C. with 1.6 parts of aluminum triethyl and 6 parts of 4-chloromethyl-1,3-dioxolone-2 were added while stirring. After 24 hours the batch solidified to form a solid, almost colorless, transparent block. In order to be worked up, the rubber-elastic, tough block polymer was dissolved to a large extent in hot methylene chloride under reflux with the addition of 4 parts of methanol whereupon the methylene chloride and the portion of tetrahydrofurane that had not undergone conversion were blown off with steam. During this operation the polymer was obtained as a solid, tough mass and was then dried in vacuo at 80° C.

Yield: 58 parts (=66%) of a reduced viscosity of 1.91 (determined in benzene at 25° C.).

The polymer that had thus been obtained was worked up into a foil 4 mm. thick under the following conditions:

5 minutes of preheating at 160° C.,
3 minutes of pressing under a pressure of 100 kg./cm.$^2$,
Cooling under a pressure of 100 kg./cm.$^2$.

The following values were measured at the resulting foil:

Tensile strength: 80 kg./cm.$^2$,
Elongation at maximum strength: 64%,
Ultimate tensile strength: 227 kg./cm.$^2$,
Elongation at break: 783%,
Tensile-E-modulus (modulus of elasticity in tension): 1435,
Density: 1052.

EXAMPLE 31

88 parts of absolute oxacyclopentane were carefully combined drop by drop, under nitrogen, with 1.2 parts of aluminum triethyl whereupon 3 parts of 4-chloromethyl-1,3-dioxolone-2 and 3 parts of epichlorhydrine were added. The batch was allowed to stand for 28 hours at room temperature and then worked up in the manner described in Example 1.

Yield: 57 parts (65%).

Reduced viscosity: 1.86 (determined at 25° C. in benzene).

The polymer was extraordinarily tough and rubber-elastic. When a specimen of the polymer was slowly heated on a Kofler bench it changed into a thinly liquid colorless molten mass at temperatures above 130° C. When it was cooled it partially crystallized. The speed of crystallization was, however, low. 30% by weight of ®Aerosil (a commercial product of the firm "Degussa") could be incorporated without difficulty with the polymer on a roll at a temperature of about 80 to 100° C. whereupon an almost transparent rolled sheet was obtained.

When the experiment was repeated under the same conditions with the exception that instead of aluminum triethyl the equimolar portion of the addition product of $BF_3$ with tetrahydrofurane was used, a paraffin-like polymer was obtained after the working up in approximately the same yield as the product prepared according to the first part of this example. When the polymer was heated on the Kofler bench it changed at about 45° C. into a thinly liquid melt. The polymer had a reduced viscosity of 0.36.

EAXMPLE 32

44 parts of absolute oxacyclopentane were combined at 0° C. under nitrogen with 0.7 part of aluminum triethyl and then 4 parts of beta,beta'-bis-chlorethyl ether were added at 0° C. After 30 hours the colorless batch which had solidified, forming a solid block, was worked up in the manner described in Example 30.

Yield: 59% by weight of polymer.

EXAMPLES 33 to 45

In these examples various organic metal compounds and various organic halogen compounds were used, in order to clearly demonstrate the efficiency of the catalyst system according to the invention. All of the experiments were carried out under an atmosphere of $N_2$ with the exclusion of moisture. In each of the experiments 4 parts of oxacyclopentane containing less than 0.02% by weight of $H_2O$ were used. The polymerization was carried out at room temperature. The results of the polymerization were evaluated after 60 hours.

member of the group consisting of a monovalent alkyl containing 1 to 6 carbon atoms, a hydrogen atom and a halogen atom, and $R_2$ represents a monovalent alkyl containing 1 to 6 carbon atoms, and (B) at least one compound of the formula

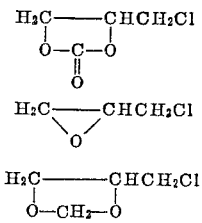

| Example No. | Organic metal compound (in parts) | Halogen compound (in parts) | Evaluation of the polymerization batch after 60 hours |
|---|---|---|---|
| 33 | 0.03 to 0.04 of $(C_2H_5)_3Al$ | | No formation of polymer perceptible. |
| 34 | 0.03 to 0.04 of $(C_2H_5)_2AlCl$ | | Do. |
| 35 | 0.03 to 0.04 of $CH_3AlCl_2$ | | Do. |
| 36 | 0.03 to 0.04 of $Zn(C_2H_5)_2$ | | Do. |
| 37 | 0.035 of $(C_2H_5)_3Al$ | 0.3 of $CH_3OCH_2CH_2Cl$ | Polymerization batch solidified to a tough colorless block. |
| 38 | 0.035 of $(C_2H_5)_3Al$ | 0.3 of $CH_2ClOCH_2CH_2Cl$ | Polymerization batch solid, colorless, highly viscous, tough. |
| 39 | 0.035 of $(C_2H_5)_3Al$ | 0.3 of $HOCH_2C(CH_2OCF_2CFClH)_3$ | Polymerization batch solid, colorless, highly viscous. |
| 40 | 0.035 of $(C_2H_5)_2AlCl$ | 0.3 of $H_2C\text{---}CH\text{---}CH_2Cl$ with O—C(=O)—O bridge | Polymerization batch highly viscous, immovable oil. |
| 41 | 0.035 of $CH_3AlCl_2$ | 0.3 of $ClCH_2CH_2OCH_2CH_2Cl$ | Polymerization batch slightly yellow oil. |
| 42 | 0.035 of $(C_4H_9)_2AlH$ | 0.3 of $H_2C\text{---}CH\text{---}CH_2Cl$ (epoxide) | Polymerization batch viscous, colorless oil. |
| 43 | 0.02 of $(C_2H_5)_3Al$ plus 0.01 of $(C_2H_5)_2Zn$. | 0.2 of $H_2C\text{---}CH\text{---}CH_2Cl$ with O—C(=O)—O bridge plus $H_2C\text{---}CHCH_2Cl$ (epoxide) | Polymerization batch slightly turbid, highly viscous oil. |
| 44 | 0.02 of $(C_2H_5)_3Al$ plus 0.01 of $(C_4H_9)_3B$. | 0.1 of $H_2C\text{---}CHCH_2Cl$ (epoxide) plus 0.2 of $H_2C\text{---}CHCH_2Cl$ with O—C(=O)—O bridge | Polymerization batch highly viscous, colorless oil. |
| 45 | 0.02 of $(C_2H_5)_3Al$ plus 0.01 of $Ti(i\text{-}OC_3H_7)_4$. | 0.1 of $H_2C\text{---}CH\text{---}CH_2Cl$ (epoxide) plus 0.2 of $H_2C\text{---}CH\text{---}CH_2Cl$ with O—C(=O)—O bridge | Polymerization batch highly viscous oil. |

We claim:

1. A process for the production of polyethers of high molecular weight which comprises the step of polymerizing, at a temperature within the range of −80 to 150° C., at least one monomer of the group consisting of saturated oxacyclobutanes and oxacyclopentane in the presence of a combination of (A) at least one organic aluminum compound of the formula

in which R represents a member of the group consisting of a monovalent alkyl containing 1 to 6 carbon atoms, a monovalent alkoxy containing 1 to 6 carbon atoms, a hydrogen atom and a halogen atom, $R_1$ represents a

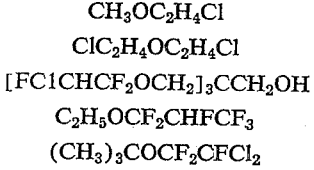

and $CH_2ClOC_2H_4Cl$

2. A process as defined in claim 1 wherein the organic aluminum compound is a trialkyl aluminum.

3. A process as defined in claim 1 wherein the B compound is

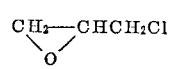

4. A process as defined in claim 1 wherein the proportion by weight of the combination of organic aluminum compound and B compound is from 0.005 to 10 percent, calculated on the weight of the monomer.

5. A process as claimed in claim 1, wherein at least one oxacyclobutane is polymerized.

6. A process as claimed in claim 1, wherein oxacyclopentane is polymerized.

7. A process as claimed in claim 1, wherein 3,3-bis-(chlromethyl)-oxacyclobutane is polymerized.

8. A process as claimed in claim 1, wherein at least one oxacyclobutane is copolymerized with at least one oxacyclopropane.

9. A process as claimed in claim 1, wherein at least one oxacyclobutane is copolymerized with 1,3,6-trioxacyclooctane.

10. A process as claimed in claim 1, wherein the polymerization is carried out in the presence of an inert organic solvent.

References Cited by the Examiner

UNITED STATES PATENTS

| | | | |
|---|---|---|---|
| 2,722,340 | 11/1955 | Feild et al. | 260—20 X |
| 2,856,370 | 10/1958 | Muetterties | 260—2 |
| 2,891,837 | 6/1959 | Campbell. | |
| 2,895,922 | 7/1959 | Goddu | 260—20 X |
| 2,947,722 | 8/1960 | Boardman | 260—20 X |

FOREIGN PATENTS 898,269   7/1944   France.

WILLIAM H. SHORT, *Primary Examiner.*

PHILLIP MANGAN, HAROLD BURSTEIN, LOUISE P. QUAST, *Examiners.*

T. D. KERWIN, L. M. MILLER, J. C. MARTIN,
*Assistant Examiners.*